United States Patent [19]

Holthoff

[11] 4,385,530

[45] May 31, 1983

[54] TRANSMISSION FOR DRIVING A STRETCH-REDUCING ROLLING MILL

[75] Inventor: Helmut Holthoff, Dusseldorf, Fed. Rep. of Germany

[73] Assignee: Kocks Technik GmbH & Company, Hilden, Fed. Rep. of Germany

[21] Appl. No.: 214,469

[22] Filed: Dec. 8, 1980

[30] Foreign Application Priority Data

Jan. 16, 1980 [DE] Fed. Rep. of Germany ....... 3001343

[51] Int. Cl.³ ...................... F16H 37/06; B21B 35/00
[52] U.S. Cl. ........................................ 74/675; 74/674; 72/249
[58] Field of Search ................... 74/675, 674; 72/249, 72/234; 464/33

[56] References Cited

U.S. PATENT DOCUMENTS

| | | | |
|---|---|---|---|
| 1,439,380 | 12/1922 | Ryding et al. | 464/33 |
| 2,054,802 | 9/1936 | Bronander | 74/675 |
| 2,546,869 | 3/1951 | Przybylski | 74/675 |
| 2,757,556 | 8/1956 | Uebing | 74/675 |
| 3,357,225 | 12/1967 | Grube | 74/675 |
| 3,628,366 | 12/1971 | Leitner | 72/249 |
| 4,000,637 | 1/1977 | Gerhards | 72/249 |
| 4,079,608 | 3/1978 | Properzi | 72/5 |
| 4,090,416 | 5/1978 | Hicks | 74/807 |

FOREIGN PATENT DOCUMENTS

| | | |
|---|---|---|
| 1652547 | 4/1971 | Fed. Rep. of Germany . |
| 1113533 | 5/1968 | United Kingdom . |
| 401434 | 10/1973 | U.S.S.R. ................................. 72/249 |

Primary Examiner—Kenneth Dorner
Assistant Examiner—Dirk Wright
Attorney, Agent, or Firm—Buell, Blenko, Ziesenheim & Beck

[57] ABSTRACT

A transmission for driving a stretch-reducing rolling mill is provided having a spur-wheel differential arranged in a spur-wheel support sleeve forming part of an auxiliary speed transmission train in a transmission for driving the rolls of a multi-stand stretch-reducing rolling mill, a spur-wheel support sleeve forming part of a basic speed transmission train is connected by way of a safety coupling having shear pins to the sun wheel of the differential transmission stage and the speed of the output shaft which forms the plantary carrier of the transmission stage is thus formed from the basic and auxiliary speeds.

9 Claims, 2 Drawing Figures

TRANSMISSION FOR DRIVING A STRETCH-REDUCING ROLLING MILL

This invention relates to transmission for driving a stretch-reducing rolling mill and particularly to a transmission for driving the rolls of a multi-stand stretch-reducing rolling mill, in which transmission a respective differential transmission stage is provided on all, or most of, the output shafts and forms the output rotational speed from a basic rotational speed and an auxiliary rotational speed.

Two drive motors are provided in known transmissions of this kind, one of which drive motors produces a basic rotational speed and the second of which motors produces an additional or auxiliary rotational speed (usually variable). The two rotational speeds are introduced into separate gear-wheel transmission trains of the transmission and are transmitted separately to all the output shafts by way of these transmission trains. In the known transmissions of this kind, bevel gear differential transmission stages are disposed between the two transmission trains and the respective output shafts and combine the basic and auxiliary rotational speeds to form the output rotational speeds.

Although these known transmissions have generally proved to be satisfactory in practical operation, they have their limitations particularly at high output rotational speeds and performances and they take up a relatively large amount of space. Furthermore, the bevel gear differential transmission stages only have a step-up ratio of 2:1 and do not permit any other step-up ratios.

An object of the invention is to provide a transmission of the kind mentioned initially which is not subjected to the above-mentioned limitations and which can transmit greater power with smaller spatial requirements.

In accordance with the invention, there is provided a transmission having, at one side of its transmission housing, outwardly extending output shafts for driving the rolls of a stretch-reducing rolling mill having a number of rolling stands arranged one after another in the rolling direction, said transmission comprising a basic speed transmission train, an auxiliary speed transmission train and a spur-wheel differential transmission stage for each of at least some of the output shafts, the spur gears forming each differential transmission stage being housed within a respective support sleeve carrying spur wheels forming part of one of said transmission trains, a safety coupling being provided for each such differential transmission stage at the side of the transmission housing remote from the output shafts.

The use of spur wheel differentials has the substantial advantage that, owing to their spur teeth, they can transmit larger torques, higher powers and rotational speeds than those which are possible when using bevel gears for reasons of gear technology. Furthermore, spur wheel differentials having various step-up ratios can be manufactured so that the output rotational speeds required can be obtained more readily. The small spatial requirement of spur wheel differentials of this kind is a special advantage which is rendered possible by disposing the spur wheel differentials in the spur wheel support sleeves of the basic rotational speed transmission train or of the auxiliary rotational speed transmission train. This arrangement permits of a particularly narrow construction of the transmission since the two transmission trains can be arranged immediately adjacent to one another in the transmission housing and, in contrast to the known constructions, space no longer has to be provided for the differential transmission stages between these transmission trains. This substantially reduces the total spatial requirement. Moreover, the special type of construction of the spur wheel differentials also renders it possible to dispose the safety coupling on the outside of the transmission housing which is remote from the rolling stands and where these couplings are rapidly and conveniently accessible. Upon the response of the safety devices in the event of a fault, such as after the shearing of safety pins, these parts can be changed in a convenient and rapid manner. The safety couplings rotate at higher speeds by virtue of using spur wheel differentials and by arranging the safety couplings on the lengthened sun wheel shafts of the spur wheel differentials, this being tantamount to smaller torques acting upon the couplings with the same torque acting upon the output journals of the drive shafts. Consequently, it is possible to use smaller and lighter safety couplings, thus reducing the prime costs.

The invention is further described by way of example, with reference to the drawings, in which.

Figure 1:
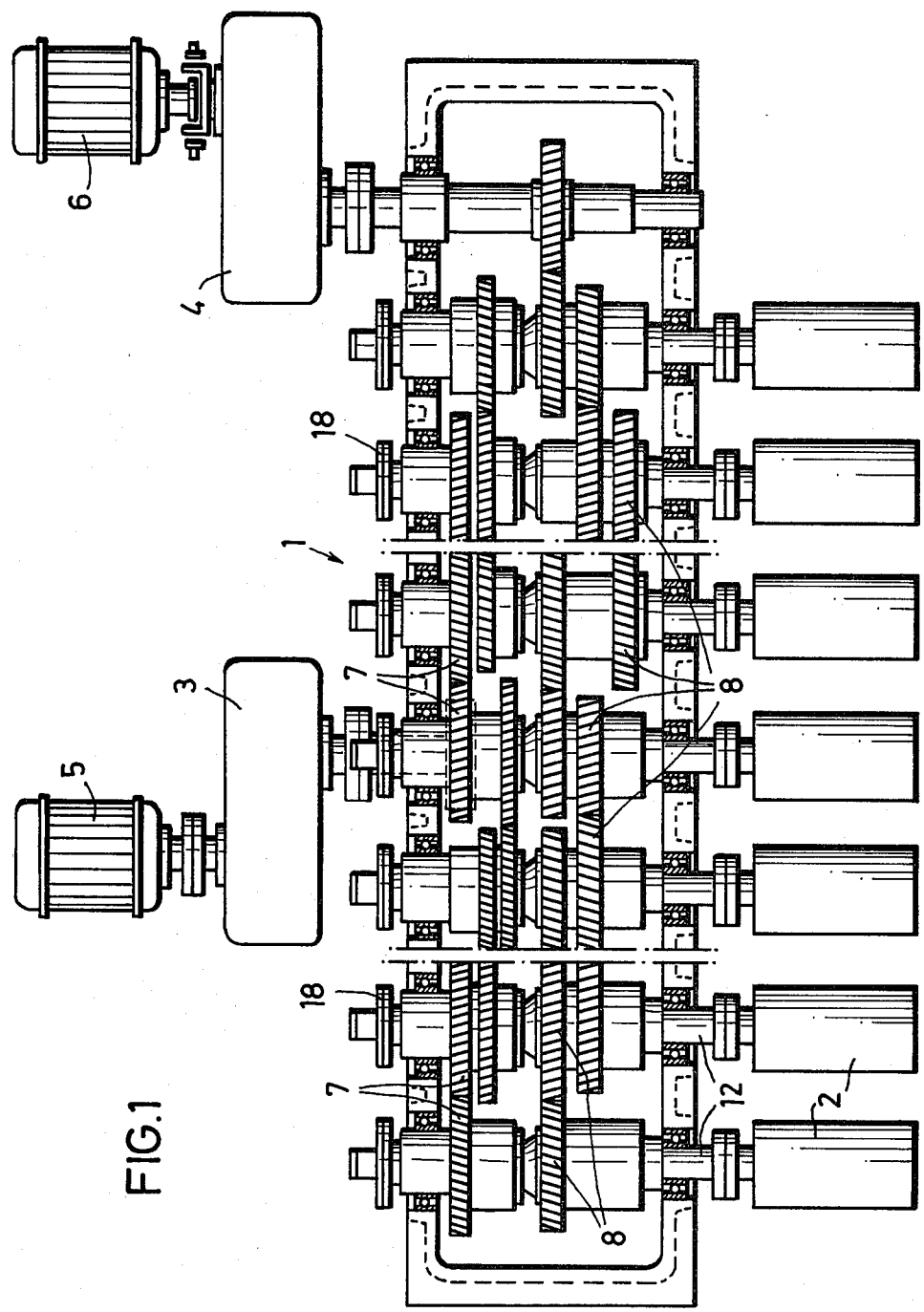
FIG. 1 is a plan view of the drive of a stretch-reducing rolling mill.

Referring to FIG. 1, a transmission 1 serves for driving the rolls of a stretch-reducing rolling mill 1 which has a number of rolling stands 2 arranged one after another in the rolling direction. The rolls (not illustrated) of the rolling stands 2 are driven by two motors 5 and 6 by way of intermediate transmissions 3 and 4, the basic rotational speed being produced by the motor 5 and the auxiliary rotational speed being produced by the motor 6. The two rotational speeds are transmitted to separate spur wheel transmission trains 7 and 8 and are conducted to the individual output shafts 12.

Figure 2:
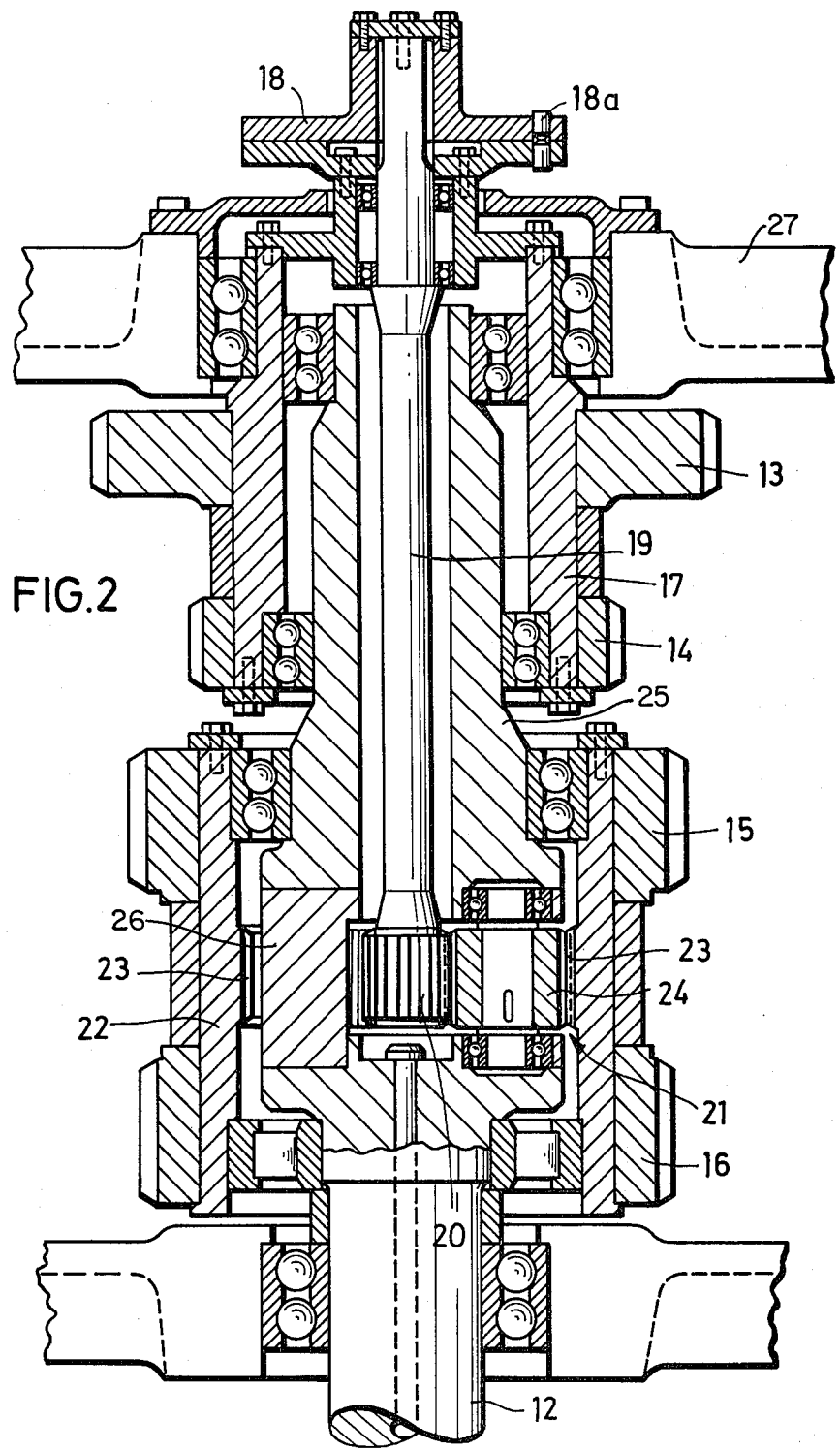
FIG. 2 is a section through an output shaft and spur wheel differential transmission stage of the rolling mill drive.

FIG. 2 shows how the prevailing basic and auxiliary rotational speeds are combined to form the output speed at an output shaft 12. The basic rotational speed is transmitted by way of gear wheels 13 and 14 which lie in the transmission train 7 (see FIG. 1) and by way of a rotatable support sleeve 17 to a safety coupling 18 having shear pins 18a and then to a sun wheel shaft 19 and to a sun wheel 20 of a spur wheel differential 21. The auxiliary rotational speed is transmitted by way of spur wheels 15 and 16 which lie in the spur wheel transmission train 8. A rotatable support sleeve 22, on which the spur wheels 15 and 16 are disposed so as to be non-rotatable relative thereto, surrounds the spur wheel differential 21 and its inside has internal teeth 23 on which the planet wheels 24 roll, the planet wheels 24 also meshing with the teeth of the sun wheel 20. The planet wheel carrier or spider of the spur wheel differential 21 is formed by opposed end faces of the output shaft 12 and a tubular extension 25 to which the output shaft 12 is secured via connectors 26. The other end of the tubular extension 25 is journalled in one end of the support sleeve 17 which is itself journalled in one cheek 27 of the transmission housing, the other end of the support sleeve 17 being journalled on the tubular extension 25. Opposite ends of the support sleeve 22 are journalled respectively on the shaft extension 25 and the shaft 12, the latter being itself journalled in the other housing cheek 28. The sun wheel shaft 19 is journalled in an end plate attached to the support sleeve 17, so that it can rotate freely if the shear pins 18a should be severed, and is the form of a shaft extending through the tubular extension 25.

The spur wheel differential, being a form of epicyclic gear, causes the output shaft 12 to be rotated at a speed formed from the basic and auxiliary speeds.

In the foregoing specification I have set out certain preferred practices and embodiments of my invention, however, it will be understood that this invention may be otherwise embodied within the scope of the following claims.

I claim:

1. A transmission for driving multiple successive roll stands of a stretch reducing rolling mill comprising a transmission housing, outwardly extending output shafts extending out of one side of said housing for driving the rolls of each of said successive rolling stands arranged one after another in the rolling direction, said output shafts equalling in number the rolling stands, a basic spur gear speed transmission train in said housing, an auxiliary spur gear speed transmission train in said housing, and a spur wheel differential transmission stage for each of at least some of the output shafts, the spur gears forming each differential transmission stage being housed within a corresponding support sleeve carrying spur wheels forming part of one of said transmission trains, a safety coupling being provided for each such differential transmission stage at the outside of the transmission housing remote from the output shafts.

2. A transmission as claimed in claim 1 in which a shaft having thereon one operative component of a corresponding differential transmission stage is connected via the safety coupling to a corresponding support carrying spur wheels forming part of the other of said transmission trains.

3. A transmission as claimed in claim 2 in which said one operative component is the sun wheel of the differential transmission stage.

4. A transmission as claimed in claim 2 or 3 in which the first mentioned support sleeve has therein the annulus of said spur wheel differential transmission stage.

5. A transmission as claimed in claim 2 or 3 in which the planetary carrier of said spur wheel differential transmission stage is formed with the respective output shaft.

6. A transmission as claimed in claim 4 in which the planetary carrier of said spur wheel differential transmission stage is formed with the respective output shaft.

7. A transmission as claimed in claim 2 or 3 in which each support sleeve is journalled, at least by one end, on one of the respective output shaft and an extension thereto.

8. A transmission as claimed in claim 4 in which each support sleeve is journalled, at least by one end, on one of the respective output shaft and an extension thereto.

9. A transmission as claimed in claim 5 in which each support sleeve is journalled, at least by one end, on one of the respective output shaft and an extension thereto.

* * * * *